US007797220B2

(12) United States Patent
McIntyre

(10) Patent No.: US 7,797,220 B2
(45) Date of Patent: Sep. 14, 2010

(54) RANGE BID MODEL

(76) Inventor: Kevin A. McIntyre, 2522 Oakwood Way, Smyrna, GA (US) 30080

( * ) Notice: Subject to any disclaimer, the term of this patent is extended or adjusted under 35 U.S.C. 154(b) by 1697 days.

(21) Appl. No.: 09/828,226

(22) Filed: Apr. 9, 2001

(65) Prior Publication Data
US 2001/0034696 A1  Oct. 25, 2001

Related U.S. Application Data

(60) Provisional application No. 60/198,750, filed on Apr. 21, 2000.

(51) Int. Cl.
*G06Q 40/00* (2006.01)
(52) U.S. Cl. .................. 705/37; 705/36 R; 705/10; 705/26; 705/27
(58) Field of Classification Search .................... 705/37, 705/36, 10, 26, 27, 1
See application file for complete search history.

(56) References Cited

U.S. PATENT DOCUMENTS

| | | | | |
|---|---|---|---|---|
| 5,495,412 | A * | 2/1996 | Thiessen | 705/1 |
| 5,615,269 | A * | 3/1997 | Micali | 705/80 |
| 5,689,652 | A * | 11/1997 | Lupien et al. | 395/237 |
| 5,749,785 | A * | 5/1998 | Rossides | 463/25 |
| 6,058,379 | A * | 5/2000 | Odom et al. | 705/37 |
| 6,112,189 | A * | 8/2000 | Rickard et al. | 705/36 R |
| 6,141,653 | A * | 10/2000 | Conklin et al. | 705/80 |
| 6,199,050 | B1 * | 3/2001 | Alaia et al. | 705/37 |
| 6,415,270 | B1 * | 7/2002 | Rackson et al. | 705/37 |
| 6,868,400 | B1 * | 3/2005 | Sundaresan et al. | 705/37 |

OTHER PUBLICATIONS

"www.businessweek.com", "Next, Online Bids Over Jail Time?", Jul. 19, 1999, website page, 1 page, printed Nov. 30, 1999.
"www.cbs.marketwatch.com", "All Aboard! Amazon Holders: Bezos' 'bozos'?", Shawn Langlois, Jul. 22, 1999, website pages, 4 pages, printed Nov. 30, 1999.
"www.clicknsettle.com", "About Us", website page, 1 page, printed Nov. 30, 1999 (origination date unknown).

(Continued)

*Primary Examiner*—Daniel S Felten
(74) *Attorney, Agent, or Firm*—Nixon & Vanderhye P.C.

(57) ABSTRACT

A range bid model allows a buyer to input an upper limit for a desired product or service (with an assumption of a zero buyer lower limit), while a seller inputs a lower limit for the product or service (with an assumption of an infinity seller upper limit). Upon the occurrence of an overlap, where the seller's lower limit is below the buyer's upper limit, the overlap region is divided evenly between the seller lower limit and the buyer upper limit, and both the buyer and seller leave the transaction with a result better than what they were willing to accept. If, however, the buyer's upper limit is below the seller's lower limit, the model provides a "no match" indication or alternatively suggests a theoretical price point between the respective limits. In a preferred operating mode, upon the occurrence of a shortage region, where the buyer upper limit is below the seller lower limit, both the buyer and seller are notified of the shortage region and are given an opportunity to adjust their respective price limits or terminate the transaction. Provisions may be included to prevent a party from gaming the system.

20 Claims, 5 Drawing Sheets

OTHER PUBLICATIONS

"www.clicknsettle.com", Evening Standard Online, "Holding Court On-Screen", John Sterlicchi, Oct. 20, 1999, website page, 1 page, printed Nov. 30, 1999.
"www.clicknsettle.com", Forbes, "Forget the Gavel and Click on the Mouse", Tomas Kellner, Jul. 2, 1999, website pages, 2 pages, printed Nov. 30, 1999.
"www.ezbid.com", website pages, 3 pages, printed Aug. 25, 1999 (origination date unknown).
"www.msnbc.com", "Out With the Judge, In With the Net", Jim Paymar, Oct. 11, 1999, website pages, 3 pages, printed Nov. 30, 1999.
"www.splitthedifference.com", website pages, 18 pages, printed Nov. 28, 2000 (origination date unknown).
"Air Travel Survey", The Economist, Mar. 10, 2001, 4 pages.
"Barter's Latest Comeback", The Economist, Oct. 21, 2000, p. 78.
"E-cash 2.0", The Economist, Feb. 19, 2000, p. 67.
"Fair Fares", Investor's Business Daily, Dec. 2, 1999, 1 page.
"Frictions in Cyberspace", The Economist, Nov. 20, 1999, p. 94.
"How to Be Perfect", The Economist, Feb. 12, 2000, p. 82.
"In the Great Web Bazaar", The Economist, Feb. 26, 2000, pp. 40, 41 and 44.
"The Market at World's End", The Economist, Sep. 11, 1999, p. 83-84; "From the Earth to the Sky", p. 84.
"A Market for Monopoly?", The Economist, Jun. 17, 2000, p. 59.
"The Net Imperative", Business and the Internet, The Economist, Jun. 26, 1999, first page and pp. 6, 17, 20-24, 27-29, 32-34 and 39-40.
"Stock Exchanges—The Battle for Efficient Markets", The Economist, Jun. 10, 2000, pp. 69-71; "Running Into Trouble", p. 72.
"Tell It to the Judge: Patent Lawyers Say Priceline.com . . . ", Wall Street Journal, Sep. 1999, 1 page.
"Under the Hammer", The Economist, Oct. 21, 2000, p. 67.
"Visible Hand", The Economist, Sep. 18, 1999, p. 69.
"What Am I Bid?", The Economist, May 6, 2000, p. 80.
"Winners Are . . . uBid's Greg Jones: Online Entrepreneur", Investor's Business Daily, Nov. 12, 1999, 3 pages.
Barlas, Pete, "Ebay's Bidding to Find Home in Real Estate", Investor's Business Daily, 2000, 2 pages.
Barlas, Pete, "Ebay Lifts E-Commerce with Sales Growth Talk", Investor's Business Daily, Nov. 9, 2000, 1 page.
Benjamin, Matthew, "Investors Bid Up Firms Providing Online Auctions", Investor's Business Daily, Date Unknown, 2 pages.
Bly, Laura, "Pick Hotel Price, Let Net Do Your Bidding", USA Today, Oct. 1, 1999, 2 pages.
Carothers, Krista, "Online Travel's Final Frontier", Condé Nast Traveler, Date Unknown, 1 page.
Coleman, Murray, "Firms Clamor to be Called 'Aggregators'", Investor's Business Daily, Oct. 16, 2000, 1 page.
Colvin, Geoffrey, "Value Driven, The Seller's Instant Net Advantage", Fortune, Jul. 10, 2000, 1 page.
Davis, Reid, "Oversales Make Dollars and Sense for Delta", Delta Airlines Plane Talk Magazine, Oct./Nov. 2000, p. 14.
Elkind, Peter, "The Hype Is Big, Really Big, At Priceline", Fortune, Sep. 6, 1999, pp. 193, 194, 196, 198, 200 and 202.
Ewing, Terzah, "Nasdaq Says Its Plan for New Electronic System Will Address Concerns About Finding Best Price". Wall Street Journal, Oct. 6, 1999, 1 page.
Gondo, Nancy, "There's Buying Power in Numbers, and the Internet is No Exception", Investor's Business Daily, 2000, 1 page.
Greco, JoAnn, "Going, Going, E-Gone! ", Art & Antiques, Sep. 1999, pp. 64, 67, 70 and 71.
Gross, Neil, "Cyberauctions You Can Finesse", Business Week, May 17, 1999, p. 89.
Korzeniowski, Paul, "Warranty Troubles, Hotel Problems? Resolution Might Be a Click Away", Investor's Business Daily, Date Unknown, 1 page.
Machan, Dyan, "An Edison fo . . . ", Forbes, May 17, 1999, pp. 178 and 180-185.
McCartney, Scott, "Airlines Find a Bag of High-Tech Tricks to Keep Income Aloft", Wall Street Journal, Jan. 20, 2000, 4 pages.
Phipps, Jennie L., "J.C. Penney Sold on New Outlet: Online Auctions", Investor's Business Daily, Feb. 25, 2000, 2 pages.
Rosato, Donna, "AOL, American Team Up", USA Today, Feb. 1, 2000, 1 page.
Shaw, Russell, "Looking to Take a Weekend Trip? Check Your E-Mail for Cheap Fares", Investor's Business Only, Nov. 2, 1999, 1 page.
Taylor, Chris, "Bot Till You Drop", Time, Oct. 11, 1999, 2 pages.
Tsuruoka, Doug, "Airlines Use Hotwire to Spark Competition with Priceline", Investor's Business Daily, Dec. 26, 2000, 1 page.
Tsuruoka, Doug, "Airline-Backed Orbitz Flies in Face of Competing Agents", Investor's Business Daily, Feb. 21, 2001, 1 page.
White, Joseph B., "OpenAuto.Com Will Let Buyers Haggle Over Prices, Features of Cars Online", Wall Street Journal, Nov. 8, 1999, 1 page.

* cited by examiner

RANGE BID MODEL

CROSS-REFERENCES TO RELATED APPLICATIONS

This application claims the benefit of U.S. Provisional Patent Application Ser. No. 60/198,750, filed Apr. 21, 2000, the entire content of which is herein incorporated by reference.

STATEMENT REGARDING FEDERALLY SPONSORED RESEARCH OR DEVELOPMENT (NOT APPLICABLE)

BACKGROUND OF THE INVENTION

The present invention relates to a bidding model, joining buyers and sellers over a global network such as the Internet and, more particularly, to a range bidding model incorporating a market element for setting prices.

There are several known bidding models in use over the Internet for joining buyers and sellers for various products and services. When a buyer's bid is accepted, for example in a first instance, the buyer may be naturally left feeling as though the original bid was too high and concerned that the same product could have been purchased with a lower bid. In a similar context, when a seller's price is accepted, for example also in a first instance, the seller may be left feeling concerned that the asking price was too low or that the buyer may have been willing to pay more for the same product.

BRIEF SUMMARY OF THE INVENTION

The present invention provides a range bid model that attempts to eliminate these potential concerns between buyers and sellers. Generally, the range bid model according to the invention allows a buyer to input an upper limit for the desired product or service, while the seller inputs a lower limit for the product or service. Upon the occurrence of an overlap, wherein the seller's lower limit is below the buyer's upper limit, the overlap region is divided evenly between the seller lower limit and the buyer upper limit, and both the buyer and seller leave the transaction with a result better than what they were willing to accept. If, however, the buyer's upper limit is below the seller's lower limit, the model can provide a "no match" indication or alternatively divide the difference between the parties. In a preferred operating mode, upon the occurrence of a shortage region, where the buyer upper limit is below the seller lower limit, both the buyer and seller are notified of the shortage region and are given an opportunity to adjust their respective price limits or terminate the transaction.

In this context, the system may include provisions to address the issue of one party attempting to "game" the system by trying to discover the other's limit price. An anti-gaming component may be embedded in the system such that the party is penalized in terms of price, time or both in arriving at a theoretical price point. The anti-gaming component could include, for example, provisions to limit a number of bids allowed per product, provisions to require that subsequent bids upon the occurrence of a shortage region can only deviate from an original bid by a certain percentage, etc. In the event of a shortage region, both the buyer and seller are always given an opportunity to terminate the transaction, which itself will serve to deter attempts to "game" the system.

With this model, the time-consuming process of offers and counter-offers is considerably shortened or completely eliminated, resulting in a price that closely matches a reasonable market price, leaving both parties satisfied that they received a fair transaction. The range bid model according to the invention is particularly suited for selling products/services where the perceived value is changing fairly rapidly and/or was never particularly well-defined in the first place. Such products/services may include perishable assets where both parties are aware of the fact that the value is moving toward zero, for example, unsold airline seats, unsold hotel rooms, unrented cars, unsold cargo/freight carrier capacity, unsold advertising, and the like including even options on the noted examples.

The range bid model of the invention helps to alleviate time concerns in situations where time is of the essence and some sort of expiration/deadline is involved (such as a scheduled airline flight). The model is designed to be bilateral and multilateral in the sense that a successful bidder can turn around and become the seller, through the model, to any other party or back to the original seller. The model can be at the heart of a continuous auction program. Moreover, each bid is revocable up until the point where a match is made, in contrast with several existing auction/bid systems. Because the model is particularly adapted for use over a global network such as the Internet, the process can remain objective, confidential and anonymous and can also be readily adapted to phone centers.

In an exemplary embodiment of the invention, a method of conducting a transaction between a buyer and a seller can be effected over a global network. The method includes receiving a lower limit price for a product from the seller, and receiving an upper limit bid for the product from the buyer. The system compares the seller lower limit price and the buyer upper limit bid, and if an overlap region exists between the seller lower limit price and the buyer upper limit bid, the system sets a price point for the product within the overlap region, preferably at a midpoint of the overlap region.

If an overlap region does not exist between the seller lower limit price and the buyer upper limit bid, the transaction is further processed according to system parameters, such as by terminating the transaction. In one alternative, the system parameters may include notifying the seller and the buyer that an overlap region does not exist and requesting the seller and the buyer to either (1) adjust the respective lower limit price and upper limit bid, or (2) terminate the transaction. A shortage region representing a difference between the lower limit price and the upper limit bid may be displayed to the seller and the buyer. In this context, the system may then either (1) receive an adjusted lower limit price and/or an adjusted upper limit bid and repeat steps (c)-(e), or (2) receive an instruction to terminate the transaction. In another alternative, the system may set a theoretical price point between the lower limit price and the upper limit bid, preferably at a midpoint between the lower limit price and the upper limit bid. In this context, the seller and the buyer are preferably provided with an opportunity to agree on the theoretical price point, and complete the transaction only if both the seller and the buyer agree on the theoretical price point. In this context, the system is preferably provided with a component for preventing gaming of the system. If there is no agreement or gaming is detected, the transaction is terminated.

The steps of receiving the seller lower limit price and the buyer upper limit bid may be practiced by receiving a lower limit price range from the seller that varies with time and receiving an upper limit bid range from the buyer that varies with time, respectively. In a similar context, the steps of receiving the seller lower limit price and the buyer upper limit bid may be practiced by additionally receiving an expiration relating to the product and by receiving a lower limit price range from the seller that varies with time to the expiration; and by additionally receiving an expiration relating to the upper limit bid and by receiving an upper limit bid range from the buyer that varies with time to the expiration, respectively.

In one embodiment, the buyer is allowed only one bid for the product. The method may also include compiling a database of information relating to sellers, buyers and products.

In another exemplary embodiment of the invention, a computer system is provided for conducting a transaction between a buyer and a seller. The computer system includes at least one user computer running a computer program that effects input information relating to one of a lower limit price for a product from the seller or an upper limit bid for the product from the buyer; and a system server running a server program. The at least one user computer and the system server are interconnected by a computer network. The system server receives the input information and processes the input information with information from other user computers by comparing the seller lower limit price and the buyer upper limit bid, wherein if an overlap region exists between the seller lower limit price and the buyer upper limit bid, the server sets a price point for the product within the overlap region.

In yet another exemplary embodiment of the invention, a computer program is embodied on a computer-readable medium for conducting a transaction between a buyer and a seller. The computer program includes structure for carrying out the method of the invention.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
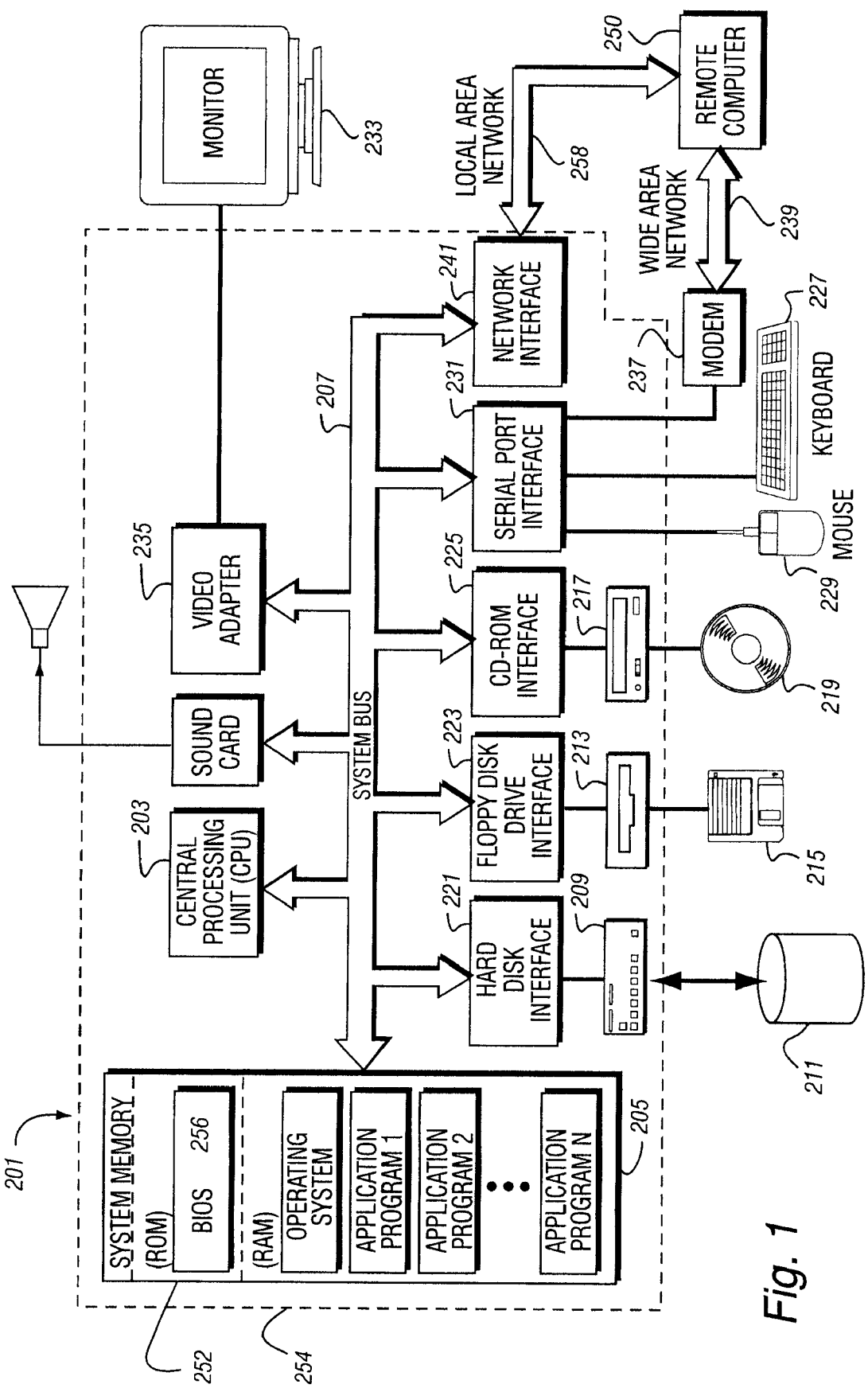
FIG. 1 is a schematic illustration of a computer system.

The range bidding model according to the invention is preferably a browser-based system in which a program running on a user's computer (the user's web browser) requests information from a server program running on a system server. The system server sends the requested data back to the browser program, and the browser program then interprets and displays the data on the user's computer screen. The process is as follows:

1. The user runs a web browser program on his/her computer.
2. The user connects to the server computer (e.g., via the Internet). Connection to the server computer may be conditioned upon the correct entry of a password as is well known.
3. The user requests a page from the server computer. The user's browser sends a message to the server computer that includes the following:
   the transfer protocol (e.g., http://); and
   the address, or Uniform Resource Locator (URL).
4. The server computer receives the user's request and retrieves the requested page, which is composed, for example, in HTML (Hypertext Markup Language).
5. The server then transmits the requested page to the user's computer.
6. The user's browser program receives the HTML text and displays its interpretation of the requested page.

Thus, the browser program on the user's computer sends requests and receives the data needed to display the HTML page on the user's computer screen. This includes the HTML file itself plus any graphic, sound and/or video files mentioned in it. Once the data is retrieved, the browser formats the data and displays the data on the user's computer screen. Helper applications, plug-ins, and enhancements such as Java™ enable the browser, among other things, to play sound and/or display video inserted in the HTML file. The fonts installed on the user's computer and the display preferences in the browser used by the user determine how the text is formatted.

If the user has requested an action that requires running a program (e.g., a search), the server loads and runs the program. This process usually creates a custom HTML page "on the fly" that contains the results of the program's action (e.g., the search results), and then sends those results back to the browser.

Browser programs suitable for use in connection with the bidding range model of the present invention include Netscape® Navigator available from Netscape®Communications Corporation and Internet Explorer available from Microsoft®Corp.

While the above description contemplates that each user has a computer running a web browser, it will be appreciated that more than one user could use a particular computer terminal or that a "kiosk" at a central location (e.g., a cafeteria, a break area, etc.) with access to the system server could be provided.

It will be recognized by those in the art that various tools are readily available to create web pages for accessing data stored on a server and that such tools may be used to develop and implement the range bidding model described below and illustrated in the accompanying drawings.

FIG. 1 generally illustrates a computer system 201 suitable for use as the client and server components of the range bidding model system. It will be appreciated that the client and server computers will run appropriate software and that the client and server computers may be somewhat differently configured with respect to the processing power of their respective processors and with respect to the amount of memory used. Computer system 201 includes a processing unit 203 and a system memory 205. A system bus 207 couples various system components including system memory 205 to the processing unit 203. The system bus 207 may be any of several types of bus structures including a memory bus or memory controller, a peripheral bus, and a local bus using any of a variety of bus architectures. System memory 207 includes read only memory (ROM) 252 and random access memory (RAM) 254. A basic input/output system (BIOS) 256, containing the basic routines that help to transfer information between elements within the computer system 201, such as during start-up, is stored in the ROM 252. The computer system 201 further includes various drives and associated computer-readable media. A hard disk drive 209 reads from and writes to a (typically fixed) magnetic hard disk 211; a magnetic disk drive 213 reads from and writes to a removable "floppy" or other magnetic disk 215; and an optical disk drive 217 reads from and, in some configurations, writes to a removable optical disk 219 such as a CD ROM or other optical media. The hard disk drive 209, magnetic disk drive 213, and optical disk drive 217 are connected to the system bus 207 by a hard disk drive interface 221, a magnetic disk drive interface 223, and an optical drive interface 225, respectively. The drives and their associated computer-readable media provide nonvolatile storage of computer-readable instructions, SQL-based procedures, data structures, program modules, and other data for the computer system 201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules may be stored on the hard disk 211, removable magnetic disk 215, optical disk 219 and/or ROM 252 and/or RAM 254 of the system memory 205. Such program modules may include an operating system providing graphics and sound APIs, one or more application programs, other program modules, and program data. A user may enter commands and information into the computer system 201 through input devices such as a keyboard 227 and a pointing device 229. Other input devices may include a microphone, joystick, game controller, satellite dish, scanner, or the like. These and other input devices are often connected to the processing unit 203 through a serial port interface 231 that is coupled to the system bus 207, but may be connected by other interfaces, such as a parallel port interface or a universal serial bus (USB). A monitor 233 or other type of display device is also connected to the system bus 207 via an interface, such as a video adapter 235.

The computer system 201 may also include a modem 237 or other means for establishing communications over the wide area network 239, such as the Internet. The modem 237, which may be internal or external, is connected to the system bus 207 via the serial port interface 231. A network interface 241 may also be provided for allowing the computer system 201 to communicate with a remote computing device 250 via a local area network 258 (or such communication may be via the wide area network 239 or other communications path such as dial-up or other communications means). The computer system 201 will typically include other peripheral output devices, such as printers and other standard peripheral devices.

As will be understood by those familiar with web-based forms and screens, users may make menu selections by pointing-and-clicking using a mouse, trackball or other pointing device, or by using the TAB and ENTER keys on a keyboard. For example, menu selections may be highlighted by positioning the cursor on the selections using a mouse or by using the TAB key. The mouse may be left-clicked to select the selection or the ENTER key may be pressed. Other selection mechanisms including voice-recognition systems, touch-sensitive screens, etc. may be used and the invention is not limited in this respect.

Figure 2:
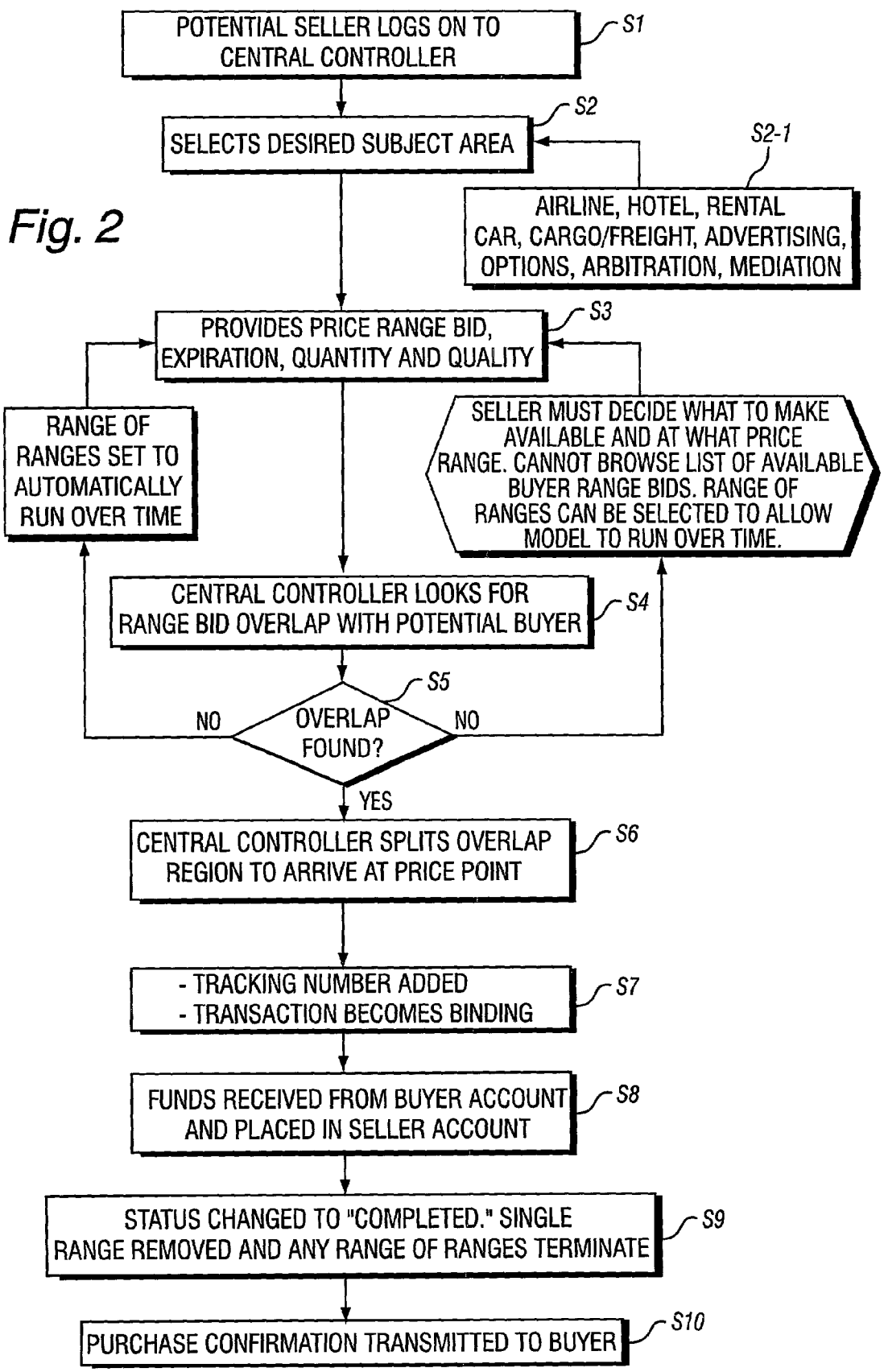
FIG. 2 is a flow diagram of a seller-side process according to the invention.

The seller-side process according to the invention will be described with reference to the flow chart of FIG. 2. Using a computer or like system as described above, in step S1, the potential seller accesses the global network, and requests an appropriate protocol and URL. In step S2, the user selects a desired subject area, examples of which are shown in FIG. 2 at S2-1. As prompted by the server system (described below), in step S3, the seller inserts a price range bid, e.g., a lower limit, expiration date, quantity, quality and other relevant parameters corresponding to the selling product or service. The central server system then looks for a range bid overlap with a potential buyer (step S4), and if an overlap is found (YES in step S5), the central controller or server system divides or splits the overlap region to arrive at a price point (step S6). Subsequently, a tracking number is added, and the transaction becomes binding (step S7). Funds received from the buyer's account are placed in the seller's account (step S8), and the transaction status is changed to "COMPLETED" (step S9). In step S10, a purchase confirmation is transmitted to the buyer, preferably by email or the like.

In the event that the central controller does not find an overlap between the seller's bid range and the buyer's bid range (NO in step S5), both a buyer and seller can be notified and requested to make adjustments to the respective bids. In this context, the system is preferably provided with provisions to prevent one party attempting to "game" the system by trying to discover the other's limit price. The anti-gaming component may serve to limit a number of bids for a particular product, prescribe a deviation maximum from an original bid, etc. Alternatively, the seller and buyer may elect to investigate the difference in bid prices and arrive at a mutually satisfactory conclusion. The seller is not able to browse a list of available buyer range bids. In fact, any party can bid without there even being an opposing bid. This "pre-bidding" simply states an intention, and can be made known to potential opposing parties to generate bids, liquidity and sales. In this context, a bidder can bid (and is encouraged to do so) on something that does not yet exist.

A range of ranges can be selected to allow the model to run over time. The range of ranges allows a bidder and/or seller to automatically change a price range by a certain amount per unit of time. As a seller, for example, one party may instruct the model to reduce the minimum by a certain amount of each of several periods of time (e.g., $10.00 every 12 hours) until a match is made or until the product is no longer available. This "range of ranges" concept is allowed as a convenience to either party, recognizing that supply and demand market forces are constantly changing. For example, in an airline context, a traveler may become slightly more desperate to secure travel plans with time.

Figure 3:
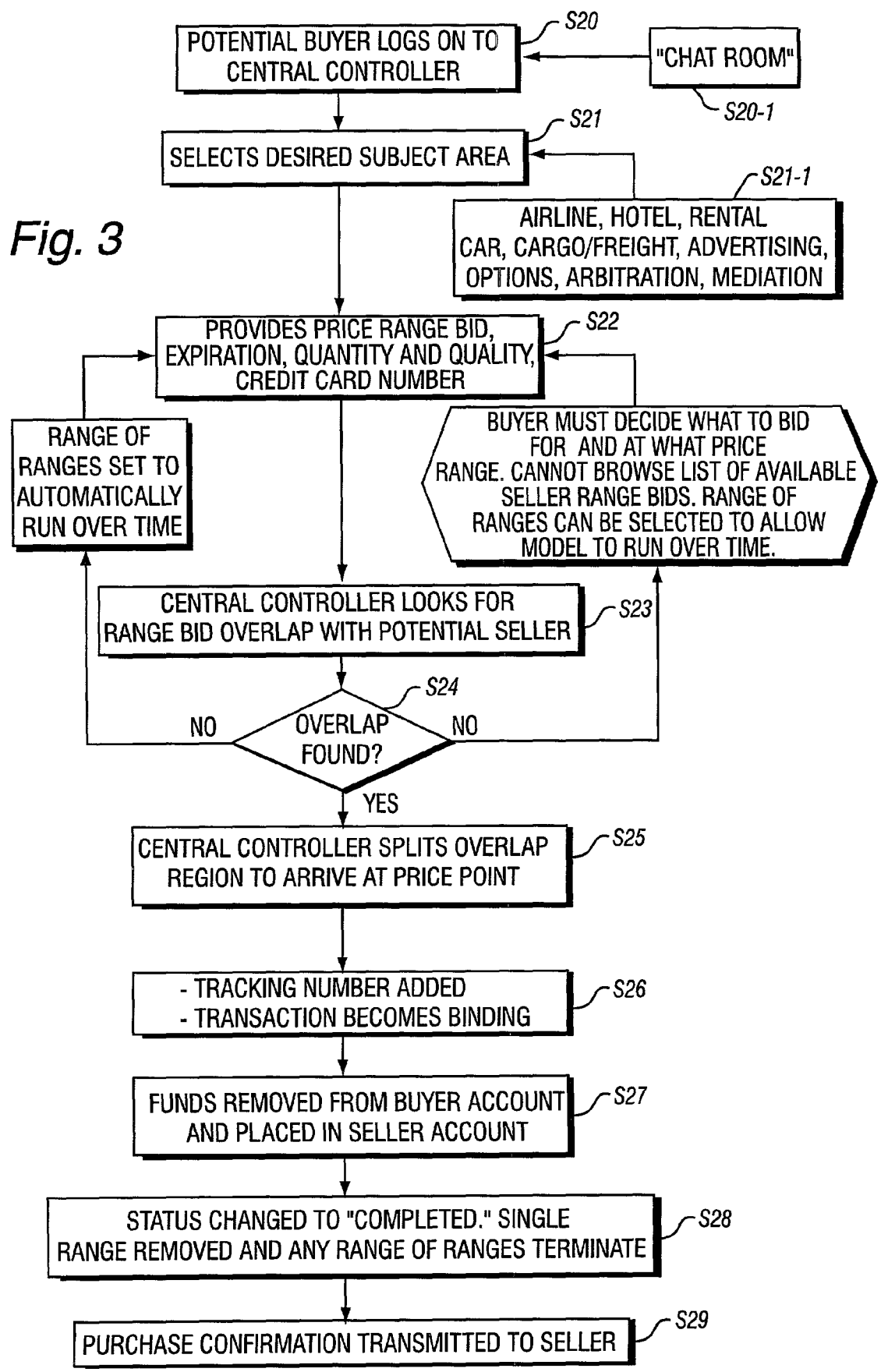
FIG. 3 is a flow diagram of a buyer-side process according to the invention.

FIG. 3 is a flow chart showing the buyer-side process according to the present invention. In step S20, a potential buyer accesses the Internet via a particular protocol and URL using a computer or like system described above. The potential buyer may access the particular site via a "chat room" S20-1 or the like. In step S21, the potential buyer selects a desired subject area, examples of which are shown at S21-1. The buyer is then prompted to input a price range bid, expiration, quantity, quality, credit card information and any other pertinent parameters relating to the desired product or service (step S22), and the central controller looks for a range bid overlap with a potential seller (step S23). If an overlap is found (YES in step S24), according to the present invention, the central controller splits or divides the overlap region to arrive a price point (step S25). In step S26, a tracking number is added, and the transaction becomes binding. Funds are removed from the buyer's account and placed in the seller's account (step S27), and the transaction status is changed to "COMPLETED" (step 28). In step S29, a purchase confirmation is transmitted to the seller via email or the like.

In the event that the central server does not find an overlap (NO in step S24), the process proceeds as outlined above with provisions to prevent system gaming, where the buyer and seller are provided an opportunity to adjust their bid range or investigate the difference in upper and lower limits to arrive at a mutually satisfactory conclusion.

In no instance is a buyer or seller permitted to browse a list of seller or buyer range bids, respectively. In the operating mode where the overlap is not found and the differences are disclosed to the buyer and seller, both the buyer and seller must agree to view the differences to allow the process to continue.

Figure 4:
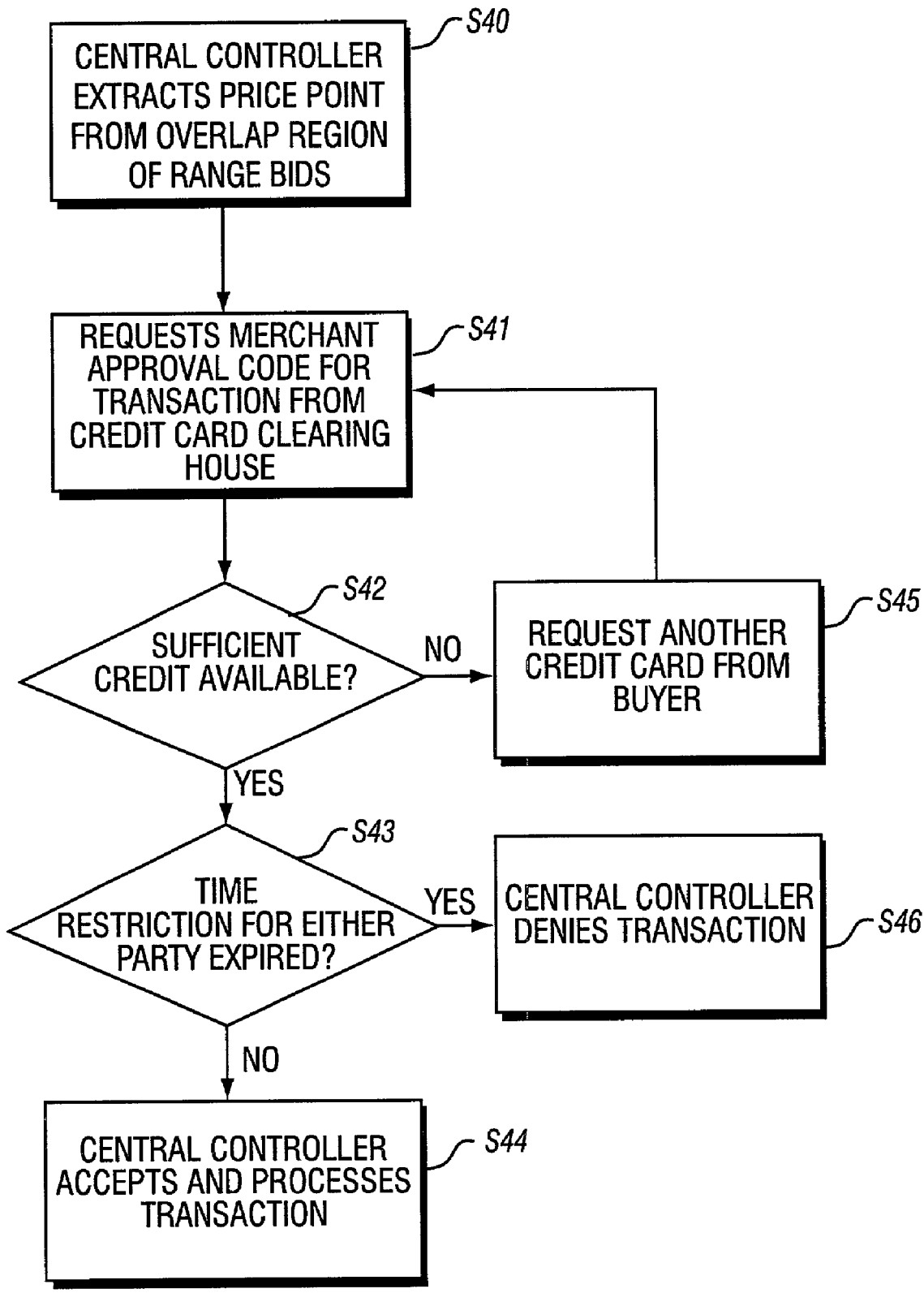
FIG. 4 is a flow diagram of the process carried out by the server-side controller.

The process carried out by the server or central controller will be described with reference to the flow chart of FIG. 4. In step S40, the central controller extracts a price point from a determined overlap region of range bids. Preferably, the price point is selected at a point midway between overlapping bids. The server then requests a merchant approval code for the transaction from the indicated credit card clearinghouse (step S41). If the approval code is received, designating that credit is sufficient (YES in step S42), and the time restriction for either party has not expired (NO in step S43), the controller accepts and processes the transaction (step S44).

If an approval code is not received, e.g., sufficient credit is not available (NO in step S42), the system alerts the buyer and requests another credit card (step S45). Moreover, if the time restriction for either party has expired (YES in step S43), the transaction is denied in step S46.

Figure 5:
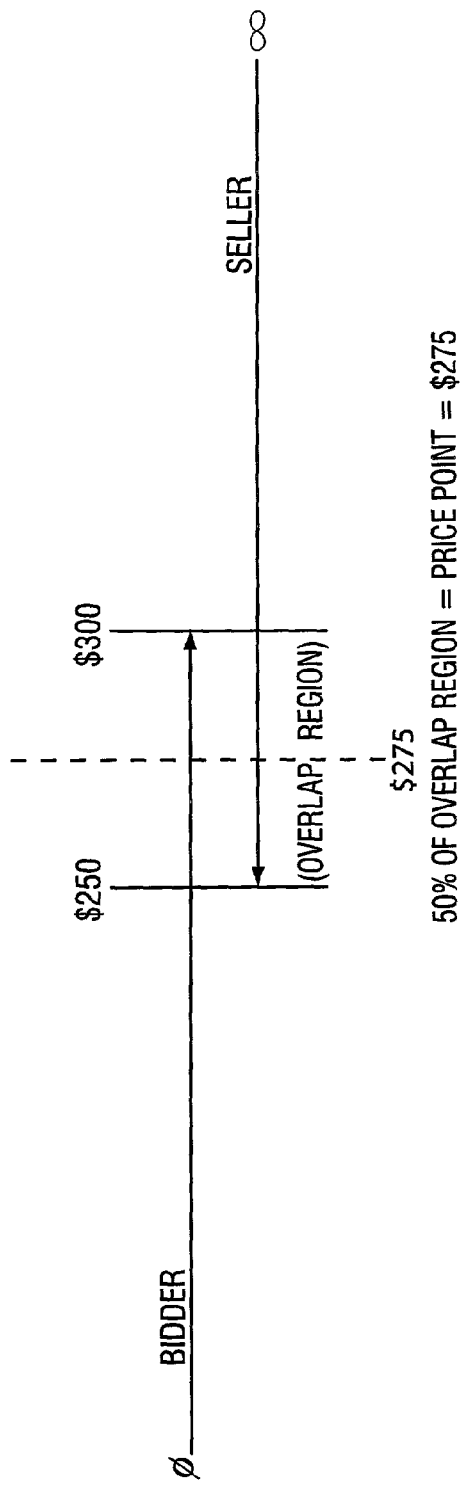
FIG. 5 illustrates an example of the model according to the invention with an overlap range.

An example of the range bid model according to the invention will be described with reference to FIGS. 5 and 6. For a buyer, there is an implied lower limit of 0, and for the seller, there is an implied upper limit of infinity. In the illustrated example, the buyer submits an upper limit bid of $300.00, and the seller submits a lower limit bid of $250.00, resulting a $50.00 overlap region. According to the present invention, the server controller system divides the overlap region evenly and sets a price point of $275.00. As a result, both the buyer and seller leave the transaction with a price better than what they were willing to accept.

According to the principles of the invention, using a global network such as the Internet, each side of the bid process can remain objective and anonymous to the other side and to other parties. Neither the bidder nor the seller is aware of the other's upper or lower limit, respectively. Nonetheless, each can possibly be made aware of the presence of a potentially opposing bid in the interest of generating bids, liquidity and sales.

Figure 6:
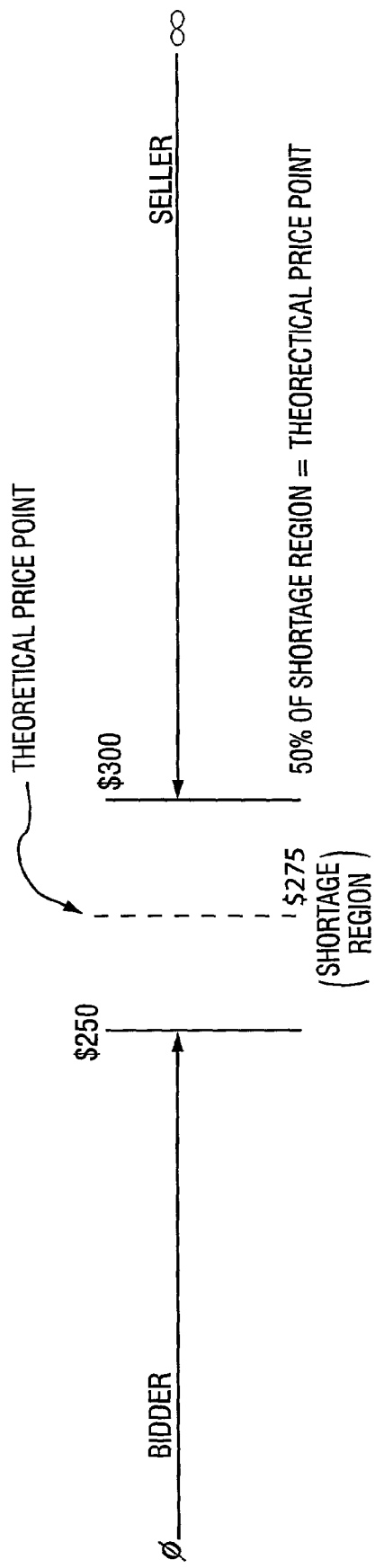
FIG. 6 illustrates an example of the model according to the invention with a shortage range.

Referring to FIG. 6, if the buyer upper limit is, for example, $250.00, and the seller lower limit is, for example, $300.00, a $50.00 shortage region exists. As described above, in this instance, the buyer and seller may be asked to adjust their bids accordingly or terminate the transaction. Alternatively, if both the buyer and seller agree, the shortage region can be displayed to each party along with a proposed theoretical price point, midway between the buyer upper limit and the seller lower limit ($275.00 in the example of FIG. 6).

The model may include both a mediation and arbitration aspect. In this context, the model would have two sides, and a bidder would have to declare at the start which side he was entering under. A mediation bid would only accept an opposing mediation bid, and when a price point is derived from the overlap region, both parties are simply advised of the price and offered the opportunity to complete the transaction at that price. An arbitration bid would only accept opposing arbitration bids. In some instance, a "mediation seller" might choose to accept only "arbitration buyers." For example, if a seller is selling a house, the seller might want to be able to look at and select from a list of binding bids. The seller could consider both the price and the quality of each bid before making a selection. PRICELINE® operates in a similar way, where buyers submit irrevocable binding bids and sellers look at that field of bids and choose presumably the highest bid and without taking into account any qualitative factors. The difference, though, is that the model according to the invention would always select all price points by the range bid process only. In more of a "buyer's market," "mediation buyers" might choose to entertain only arbitration sellers and there might even be a case where a buyer or seller might want to accept either type of bid. With these parameters, the system effects a whole matrix process for entering the range bid model.

With the range bid model according to the present invention, bidders can readily band together in a chat room or the like to make collective bids and pursue a volume discount. The system allows sellers to clear out goods and services without lowering published prices, due to anonymity and the like. Moreover, the system can be readily adapted for automatic credit card billing or the use of an escrow account. The model operates almost instantaneously as long as there are bidders and the seller's database contains inventory. A bidder may have to wait for a seller to establish inventory (pre-bidding), and a provision may be incorporated wherein the bidder can revoke his bid while waiting. In contrast with existing bid and/or auction type systems, the buyer is not supplied with "targets," so the buyer's upper limit is not biased or skewed in the seller's favor.

The range bid model according to the invention is also suited for settling arbitration, mediations and negotiations, especially where financial settlements are involved. The system may also be suitable for use with frequent flyer points instead of money, allowing an airline to set flexible and dynamic caps on the number of seats per flight allocable for frequent flyer mile cash-ins. The model may be also embodied in a portable computer readable medium or downloaded for one-time use.

A bidder's bot could search for sellers within a certain set of criteria, and email the buyer of a discovery. The buyer could then be able to apply the range bid model. A seller's bot would search for potential bidders. This bot system would greatly increase liquidity even in very narrow asset classes.

The range bid model according to the invention is designed to operate continuously and instantly, but may also allow batch basis over a set period of time with a standard close time as in a typical auction. In this context, however, the model would have to show a bias by selecting the highest price point from ranges bid over the time interval. Matching bids can be resolved by awarding the transaction to the first bidder.

In another operating mode of the range bid model according to the invention, if both parties to the transaction are agreeable, each party may be limited to only one bid per item/application. Consequently, both parties would be forced to be more realistic in making a bid, thereby increasing the likelihood of establishing an overlap region right away. Furthermore, one party may exert pressure on the other by telling the model that it will only accept this type of one-bid procedure (e.g., serious inquiries only). An airline, for example, may use this provision to sell tickets for known high-demand periods. A purchaser may use this provision when supply for a particular product/service is in abundance, and the purchaser is willing to walk away from the deal if no overlap region is established. On the other hand, a seller may use it when demand is high, etc.

The range bid model may also include, as a proprietary asset, the database of information derived from running any application, for example, including the database of price points, theoretical price points from the shortage region, rates of change and step size of bids in the range of ranges. This information could be used to analyze buyer and seller behavior for the purpose of setting price points for similar goods and services sold outside of the model. It would also be very useful in establishing targeted advertising.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of conducting a transaction between a buyer and a seller over a global network with a computer system, the method comprising:
(a) receiving a lower limit price for a product from the seller via the global network, the buyer being unaware of the seller's lower limit price;
(b) receiving an upper limit bid for the product from the buyer via the global network, the seller being unaware of the buyer's upper limit bid;
(c) the computer system comparing the seller lower limit price and the buyer upper limit bid;
(d) if an overlap region exists between the seller lower limit price and the buyer upper limit bid, the computer system setting a price point for the product within the overlap region that is based on the lower limit price and the upper limit bid; and
(e) if an overlap region does not exist between the seller lower limit price and the buyer upper limit bid, the computer system further processing the transaction without seller or buyer input by setting a theoretical price point between the lower limit price and the upper limit bid,
wherein step (a) is practiced by additionally receiving an expiration relating to the product and by receiving a lower limit price range from the seller that varies with time to the expiration.

2. A method of conducting a transaction between a buyer and a seller over a global network with a computer system, the method comprising:
(a) receiving a lower limit price for a product from the seller via the global network, the buyer being unaware of the seller's lower limit price;
(b) receiving an upper limit bid for the product from the buyer via the global network, the seller being unaware of the buyer's upper limit bid;
(c) the computer system comparing the seller lower limit price and the buyer upper limit bid;
(d) if an overlap region exists between the seller lower limit price and the buyer upper limit bid, the computer system setting a price point for the product within the overlap region that is based on the lower limit price and the upper limit bid; and
(e) if an overlap region does not exist between the seller lower limit price and the buyer upper limit bid, the computer system further processing the transaction without seller or buyer input by setting a theoretical price point between the lower limit price and the upper limit bid,
wherein step (b) is practiced by additionally receiving an expiration relating to the upper limit bid and by receiving an upper limit bid range from the buyer that varies with time to the expiration.

3. A method of conducting a transaction between a buyer and a seller over a global network with a computer system, the method comprising:
(a) receiving a lower limit price for a product from the seller via the global network, the buyer being unaware of the seller's lower limit price;
(b) receiving an upper limit bid for the product from the buyer via the global network, the seller being unaware of the buyer's upper limit bid;
(c) the computer system comparing the seller lower limit price and the buyer upper limit bid;
(d) if an overlap region exists between the seller lower limit price and the buyer upper limit bid, the computer system setting a price point for the product within the overlap region that is based on the lower limit price and the upper limit bid;
(e) if an overlap region does not exist between the seller lower limit price and the buyer upper limit bid, the computer system further processing the transaction without seller or buyer input by setting a theoretical price point between the lower limit price and the upper limit bid; and
(f) compiling a database of information relating to sellers, buyers, products and price points.

4. A method according to claim 3, wherein if an overlap region exists between the seller lower limit price and the buyer upper limit bid, step (d) is practiced by setting the price point for the product at a midpoint of the overlap region.

5. A method according to claim 3, wherein step (e) is practiced by setting a theoretical price point at a midpoint between the lower limit price and the upper limit bid.

6. A method according to claim 3, further comprising providing the seller and the buyer with an opportunity to agree on the theoretical price point, completing the transaction only if both the seller and the buyer agree on the theoretical price point, and otherwise terminating the transaction.

7. A method according to claim 6, further comprising providing a component for preventing gaming of the system.

8. A method according to claim 3, wherein step (e) is further practiced by displaying a shortage region representing a difference between the lower limit price and the upper limit bid to the seller and the buyer.

9. A computer system for conducting a transaction between a buyer and a seller, the computer system comprising:
at least one user computer running a computer program that effects input information relating to one of a lower limit price for a product from the seller or an upper limit bid for the product from the buyer, wherein the buyer is unaware of the seller's lower limit price and the seller is unaware of the buyer's upper limit bid; and
a system server running a server program, the at least one user computer and the system server being interconnected by a computer network, the system server receiving the input information and processing the input information with information from other user computers by comparing the seller lower limit price and the buyer upper limit bid, wherein if an overlap region exists between the seller lower limit price and the buyer upper limit bid, the server setting a price point for the product within the overlap region that is based on the lower limit price and the upper limit bid, and wherein if an overlap region does not exist between the seller lower limit price and the buyer upper limit bid, the server further processing the transaction without seller or buyer input by setting a theoretical price point between the lower limit price and the upper limit bid.

10. A computer program embodied on a computer-readable medium for conducting a transaction between a buyer and a seller, the computer program comprising:

means for receiving a lower limit price for a product from the seller, the buyer being unaware of the seller's lower limit price;

means for receiving an upper limit bid for the product from the buyer, the seller being unaware of the buyer's upper limit bid; and means for comparing the seller lower limit price and the buyer upper limit bid, wherein if an overlap region exists between the seller lower limit price and the buyer upper limit bid, the comparing means comprises means for setting a price point for the product within the overlap region that is based on the lower limit price and the upper limit bid, and wherein if an overlap region does not exist between the seller lower limit price and the buyer upper limit bid, the comparing means comprises means for further processing the transaction without seller or buyer input by setting a theoretical price point between the lower limit price and the upper limit bid.

11. A computer program according to claim 10, wherein if an overlap region exists between the seller lower limit price and the buyer upper limit bid, the setting means sets the price point for the product at a midpoint of the overlap region.

12. A method of conducting a transaction between a buyer and a seller over a global network with a computer system, the method comprising:
(a) receiving a lower limit price for a product from the seller via the global network;
(b) receiving an upper limit bid for the product from the buyer via the global network, wherein step (b) is practiced by allowing only one bid for the product from the buyer;
(c) the computer system comparing the seller lower limit price and the buyer upper limit bid;
(d) if an overlap region exists between the seller lower limit price and the buyer upper limit bid, the computer system setting a price point for the product within the overlap region that is based on the lower limit price and the upper limit bid; and
(e) if an overlap region does not exist between the seller lower limit price and the buyer upper limit bid, further processing the transaction according to predefined parameters.

13. A method according to claim 12, wherein step (e) is practiced by terminating the transaction.

14. A method according to claim 12, wherein step (e) is practiced by notifying the seller and the buyer that an overlap region does not exist and requesting the seller and the buyer to either (1) adjust the respective lower limit price and upper limit bid, or (2) terminate the transaction.

15. A method according to claim 14, further comprising, after step (e), either (1) receiving an adjusted lower limit price and an adjusted upper limit bid and repeating steps (c)-(e), or (2) receiving an instruction to terminate the transaction.

16. A method according to claim 14, further comprising, after step (e) receiving one of an adjusted lower limit price or an adjusted upper limit bid, and repeating steps (c)-(e).

17. A method of conducting a transaction between a buyer and a seller over a global network with a computer system, the method comprising:
(a) receiving a lower limit price for a product from the seller via the global network;
(b) receiving an upper limit bid for the product from the buyer via the global network, wherein step (b) is practiced by allowing only one bid for the product from the buyer;
(c) the computer system comparing the seller lower limit price and the buyer upper limit bid;
(d) if an overlap region exists between the seller lower limit price and the buyer upper limit bid, the computer system setting a price point for the product within the overlap region that is based on the lower limit price and the upper limit bid; and
(e) compiling a database of information relating to sellers, buyers, products and price points.

18. A method of conducting a transaction between a buyer and a seller over a global network with a computer system, the method comprising:
(a) receiving a lower limit price for a product from the seller via the global network, the buyer being unaware of the seller's lower limit price;
(b) receiving an upper limit bid range from the buyer via the global network that varies with time, the seller being unaware of the buyer's upper limit bid range;
(c) the computer system comparing the seller lower limit price and the buyer upper limit bid based on time; and
(d) if an overlap region exists between the seller lower limit price and the buyer upper limit bid based on time, the computer system setting a price point for the product within the overlap region that is based on the lower limit price and the upper limit bid; and
(e) compiling a database of information relating to sellers, buyers, products and price points.

19. A method of conducting a transaction between a buyer and a seller over a global network with a computer system, the method comprising:
(a) receiving a lower limit price for a product from the seller via the global network;
(b) receiving an upper limit bid for the product from the buyer via the global network, wherein step (b) is practiced by allowing only one bid for the product from the buyer;
(c) the computer system comparing the seller lower limit price and the buyer upper limit bid;
(d) if an overlap region exists between the seller lower limit price and the buyer upper limit bid, the computer system setting a price point for the product within the overlap region that is based on the lower limit price and the upper limit bid; and
(e) compiling a database of information relating to sellers, buyers, products and price points.

20. A method of conducting a transaction between a buyer and a seller over a global network with a computer system for exchange of a product of decaying value, the method comprising:
(a) receiving a lower limit price for the product from the seller via the global network, the buyer being unaware of the seller's lower limit price;
(b) receiving an upper limit bid for the product from the buyer via the global network, the seller being unaware of the buyer's upper limit bid;
(c) receiving an expiration relating to the product and receiving at least one of a lower limit price range from the seller via the global network or an upper limit bid range from the buyer via the global network that varies with time to the expiration;
(d) the computer system comparing the seller lower limit price and the buyer upper limit bid relative to time;
(e) if an overlap region exists between the seller lower limit price and the buyer upper limit bid, the computer system setting a price point for the product within the overlap region that is based on the lower limit price and the upper limit bid and completing the transaction; and
(f) compiling a database of information relating to sellers, buyers, products and price points.

* * * * *